US009003486B2

United States Patent
Asokan et al.

(10) Patent No.: US 9,003,486 B2
(45) Date of Patent: Apr. 7, 2015

(54) METHODS AND APPARATUS FOR RELIABLE AND PRIVACY PROTECTING IDENTIFICATION OF PARTIES' MUTUAL FRIENDS AND COMMON INTERESTS

(75) Inventors: Nadarajah Asokan, Espoo (FI); Markus Miettinen, Saint-Sulpice (CH)

(73) Assignee: Nokia Corporation, Espoo (FI)

( * ) Notice: Subject to any disclaimer, the term of this patent is extended or adjusted under 35 U.S.C. 154(b) by 80 days.

(21) Appl. No.: 13/351,354

(22) Filed: Jan. 17, 2012

(65) Prior Publication Data

US 2013/0185777 A1 Jul. 18, 2013

(51) Int. Cl.
*H04L 29/06* (2006.01)
*G06F 21/31* (2013.01)
*H04L 9/14* (2006.01)

(52) U.S. Cl.
CPC . *G06F 21/31* (2013.01); *H04L 9/14* (2013.01)

(58) Field of Classification Search
USPC .......................................... 726/9, 6; 713/168
See application file for complete search history.

(56) References Cited

U.S. PATENT DOCUMENTS

| 2001/0020228 | A1* | 9/2001 | Cantu et al. ........................ 705/1 |
| 2003/0036914 | A1 | 2/2003 | Fitzpatrick et al. |
| 2004/0044536 | A1 | 3/2004 | Fitzpatrick et al. |
| 2006/0294192 | A1* | 12/2006 | Mao et al. ..................... 709/213 |
| 2007/0208747 | A1 | 9/2007 | Puckrin |
| 2010/0191964 | A1* | 7/2010 | Haddad et al. ................ 713/168 |
| 2011/0185020 | A1* | 7/2011 | Ramamurthy et al. ........ 709/204 |
| 2012/0109830 | A1* | 5/2012 | Vogel .............................. 705/75 |
| 2012/0209910 | A1* | 8/2012 | Svendsen et al. ............. 709/204 |
| 2012/0214443 | A1* | 8/2012 | Daigle .......................... 455/411 |
| 2013/0318347 | A1* | 11/2013 | Moffat .......................... 713/168 |

OTHER PUBLICATIONS

"Fast and Private Computation of Set Intersection Cardinality", Emiliano De Cristofaro, et al., University of California, 7 pgs.
Privacy-Preserving Applications on Smartphones, Yan Huang, et al., University of Virginia, 6 pgs.
"StarClique: Guaranteeing User Privacy in Social Networks Against Intersection Attacks", Krishna P.N. Puttaswamy et al., ACM CoNEXT, Dec. 2009, 12 pgs.
"Short Paper: Can Your Phone Trust Your Friend Selection?", Sebastian Trapp, et al., SPSM, Oct. 2011, 6 pgs.
VENETA: Serverless Friend-of-Friend Detection in Mobile Social Networking, Marco von Arb et al., Computer Engineering and Networks Laboratory, 6 pgs.

(Continued)

*Primary Examiner* — Edward Zee
*Assistant Examiner* — Chi Nguy
(74) *Attorney, Agent, or Firm* — Harrington & Smith

(57) ABSTRACT

Systems and techniques for authenticating joint friends of users of wireless devices. An authenticating authority delivers a token to a wireless device for each party identified as a friend of a user of the wireless device, such as through relationships in an online social network. Two wireless devices can use information relating to the tokens to determine information relating to joint friends of the users of the devices, such as the identities of joint friends or simply the numbers of joint friends. Tokens can be further refined to allow for analysis that provides information relating to the degree of intimacy of the relationship between a user and a party identified as a friend.

17 Claims, 4 Drawing Sheets

(56) References Cited

OTHER PUBLICATIONS

Freedman, M., et al.; "Efficient Private Techniques for Verifying Social Proximity"; IPTPS; Aug. 24, 2007; whole document (7 pages), chapters 3, 4.1, 5; Retrieved from the Internet: http://web.archive.org/web/20070715000000*/http://www.cs.princeton.edu/~mfreed/docs/fof-iptps07.pdf.

Garriss, S., et al.; "RE: Reliable Email"; Proc. NSDI; Jul. 12, 2006; whole document (14 pages); Retrieved from the Internet: http://web.archive.org/web/20060712161954/http://www.scs.stanford.edu/~dm/home/papers/garriss:re.pdf.

De Cristofaro, E., et al.; "Private Discovery of Common Social Contacts"; Sep. 12, 2011; whole document (16 pages); Retrieved from the Internet: http://web.archive.org/web/20110912131028/http://eprint.iacr.org/2011/026.pdf

* cited by examiner

METHODS AND APPARATUS FOR RELIABLE AND PRIVACY PROTECTING IDENTIFICATION OF PARTIES' MUTUAL FRIENDS AND COMMON INTERESTS

TECHNICAL FIELD

The exemplary and non-limiting embodiments of this invention relate generally to systems, methods, devices and computer programs for data analysis, and more specifically relate to mechanisms for privacy protecting but reliable identification of shared friends or shared interests of different users

BACKGROUND

As the use of data processing devices and services has become more and more widespread, the ability and use of such devices and services to manage many aspects of users' lives has continued to grow. One significant feature of the widespread use of data processing devices and services has been their increasing use to manage users' social contacts. Large amounts of information relating to users' contacts are stored both locally on users' devices and remotely, such as by social networking websites. Particularly in the case of close or intimate friends, the association of a user's friends with an activity or person contributes to the confidence a user is likely to have in the activity or person. One significant contributor to confidence in an unknown user is to identify friends in common with the unknown user. However, obtaining information identifying common friends presents privacy risks, and also presents risks of resting unjustified confidence in an unknown user who falsely claims to share friends with a user seeking assurances.

SUMMARY

In one embodiment of the invention, an apparatus comprises memory, at least one processor, and a program of instructions. The program of instructions is configured to, with the memory and the at least one processor, configure the apparatus to perform actions comprising at least receiving at least one token from an authenticating authority, wherein each token authenticates another party as a friend of a user of the apparatus, communicating with a wireless communication device of another user possessing at least one similar token authenticating at least one party as a friend of the user of the device, and analyzing information received in the communication to make determinations relating to the status of at least one party as a joint friend of the user of the apparatus and the user of the device.

In another embodiment of the invention, an apparatus comprises memory, at least one processor, and a program of instructions. The program of instructions is configured to, with the memory and the at least one processor, configure the apparatus to perform actions comprising at least creating at least one token authenticating a party as a friend of a user of a wireless communication device; and delivering the at least one token to the device.

In another embodiment of the invention, a method comprises configuring at least one processor to cause an apparatus to perform actions comprising at least creating at least one token authenticating a party as a friend of a user of a wireless communication device; and delivering the at least one token to the device.

In another embodiment of the invention, a computer readable medium stores a program of instructions. Execution of the instructions by a processor configures an apparatus to perform actions comprising at least creating at least one token authenticating a party as a friend of a user of a wireless communication device; and delivering the at least one token to the device.

These and other embodiments and aspects are detailed below with particularity.

DETAILED DESCRIPTION

Figure 1:
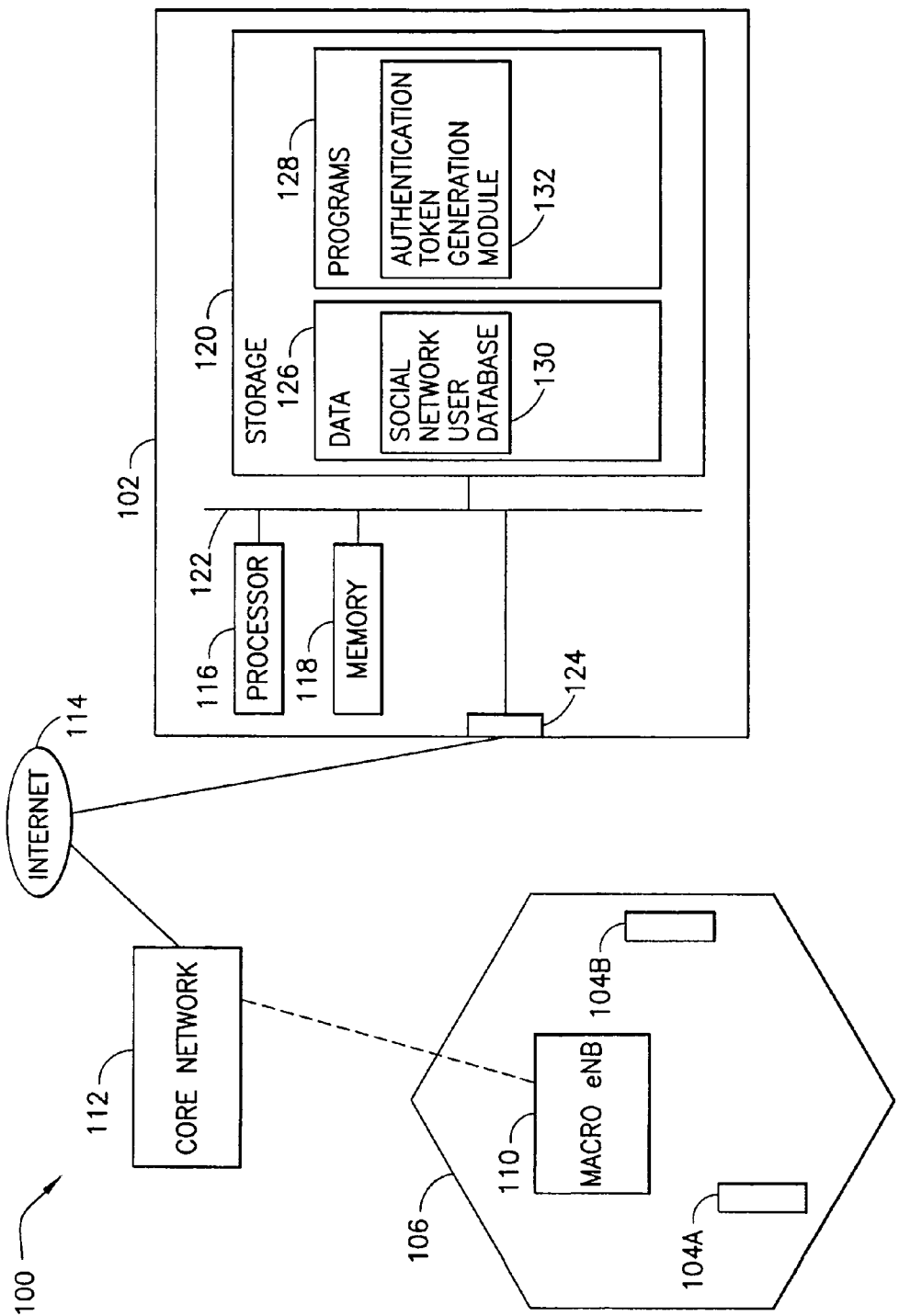
FIG. 1 illustrates a system according to an embodiment of the present invention.

Embodiments of the present invention recognize that information identifying a user's friends presents significant risks to privacy, both to the user and to the friends. Identification of a user's friends can be valuable, both to well-meaning or innocent parties and to ill-meaning parties and for this reason it is undesirable for users to provide information relating to their friends to unknown users or to services who purport to examine the sets of friends of two different users and identify joint friends. Mechanisms for private set intersection to identify members that jointly belong to the set of friends of two users are known. Private set intersection allows for two parties to engage in processing of information, at least a portion of which is secretly held by at least one of the parties, without revealing to the other party any of the privately held information that is not revealed by the results of the processing. For example, in a private set intersection of the friends of user A and user B, user A would learn the identities the friends of user B who were also friends of user A, but would not learn the identities of those friends of user B who were not also friends of user A.

However, the privacy provided by these mechanisms can be overcome by an attacker who falsely claims to share friends with an inquiring user. For example, an attacker user may simply find a city database listing, for example, all the residents of a city. The attacker may present the persons listed in this database as the set of friends of the attacker. Private set intersection of this set with the set of friends of an inquiring user will yield a large intersecting set. The intersecting set will include all the friends of the inquiring user who are listed in the city database.

Private set intersection cardinality computation can provide important information for users without any need to identify the actual identities of their friends, but such approaches are also subject to compromise by attackers. The computation of the cardinality of a set intersection yields the size of the set intersection, but if the size of the intersection is based on fraudulent information provided by an attacker, the user relying on the computation will rest unjustified trust in the attacker. In the example presented above, for example, a cardinality computation will indicate that the attacker shares nearly all of the local friends of the user.

Embodiments of the present invention therefore provide mechanisms to insure that persons presented by a user as friends are actually friends of the user. Such mechanisms may use entities such as online social networks as authenticating agents, because such networks use procedures that at least require assent by both parties to identify users as friends of one another. Such procedures typically end the identification when the assent is withdrawn by either party. In addition, online social networks may recognize a number of different degrees of closeness that may be selected by users, and may also be able to evaluate the level of closeness of users based on activities in which they engage. Online social networks may thus be able to classify users based on closeness, so that users sharing closer friends may expect that they may rest greater trust in one another.

Therefore, one or more embodiments of the present invention provide for an authenticator that may be a social network server, or another device having access to information generated or stored in conjunction with the social activities of users. FIG. 1 illustrates a system 100 according to an embodiment of the present invention. The system 100 comprises an authentication server 102 accessible to one or more user devices, of which the devices 104A and 104B will serve as representative examples. The devices 104A and 104B may be user devices, or UEs, served by a wireless network, represented here by a wireless network cell 108, defined as a geographic area within range of a wireless base station, here exemplified by an eNodeB or eNB 110. The UEs 104A and 104B are provided by the eNB 110 with access to a core network 112, which in turn provides access to external networks such as the Internet 114. The Internet 114 or other suitable networks may be used as a convenient mechanism through which the UEs 104A and 104B may communicate with the authentication server 102. The authentication server 102 suitably comprises a processor 116, memory 118, and storage 120, suitably communicating over a bus 122. The authentication server 102 may also comprise a network interface 124, providing access to the Internet 114.

The authentication server 102 employs data 126 and programs 128, suitably residing in storage 120 and transferred to memory 118 as needed for use by the process 116, such as execution in the case of programs 128 and operations or analysis in the case of data 126. The data 126 suitably comprises a social network user database 130, storing identification information for the various users of a social network. The social network user database 130 suitably identifies each user of the social network, and also includes indicia for each user indicating the user's status with respect to other users. Users of a social network who have jointly assented to some kind of relationship within the parameters of the social network are commonly referred to as "friends," and that the status of users as "friends" indicates a degree of social closeness as defined by the social network. If a user designated as a friend of another user, both users may, for example, have the ability to see information relating to the other user that is not shown to members of users who are not designated as friends. Designation as a friend may also, for example, give a user the ability to make changes to or leave comments on another's social network page. Assenting to give a user the ability to engage in such actions presents risks and is therefore unlikely to be undertaken without some level of trust in the user. Embodiments of the present invention recognize, then, that authentication of a party's status of a social network friend of a user implies that the party has rested some level of trust in the user, and that a party has been designated as a friend of two different users, both users have been trusted by the same party.

Indicia indicating the status of a friend may include indications of the degree of closeness of the relationship between users. For example, friend U, of user U may be classified as a first, second, or third class friend, with a first class friend being a member of the immediate family or an intimate friend, a second class friend being a more casual friend, and a third class friend being an acquaintance.

The authentication server 102 suitably implements an authentication token generation module 132. The authentication token generation module 132 provides an authentication token to a requesting user U, for example, for each party $U_i$ that is identified as a friend of the user U. The authentication token may suitably take the form Mac_i=MAC(K, metadata|$U_i$). The component "metadata" represents additional information about the token such as the type of token, and limitations such as the lifetime of the token. Metadata may be provided to the user along with the token and may be used by the user's device in determining which set of tokens to use in a given situation. For example, depending on the particular configuration of a system such as the system 100, tokens may exist that simply identify a party, and whose possession by a user device authenticates that the user has a relationship with the party. Alternatively, or in addition, tokens may exist that designate a relationship of a specified closeness with a party, and whose possession by a user authenticates a relationship of the specified level of closeness. Alternatively or in addition, tokens may exist that designate a particular interest of a party, such as an interest in travel to a particular city, or a "like" relationship with a particular Facebook page. Possession of such a token by a user indicates that the user has indicated such a shared interest with the party, for example, by "liking" the same Facebook page.

A token having particular characteristics, such as indicating will be given to users who are identified as friends of the user $U_i$ in the social network. The tokens may be given to devices based solely on the basis of their identification in the database 130, rather than based on requests from a user. That is, the authentication server knows the identity of the user U, and knows the identities of the parties identified as friends of the user U by the social network. Therefore, once the user U is identified to the authentication server 102, the authentication server 102 does not need to receive a specific indication from the device belonging to the user U as to who are the friends of the user U. The authentication token generation module 132 can simply compute authentication tokens for each party known to be identified as a friend of the user U, so that these tokens can be provided to the requesting device. For example, therefore, each of the UEs 104A and 104B may request authentication tokens from the authentication server 102. In order for one of the devices 104A and 104B to receive any authentication tokens at all, the device must authenticate itself to the server 102. In order to receive a token associated with a particular party P, a device such as the devices 104A and 104B must be known to the authentication server 102 as being associated with a user identified in the social network user database 130 as a friend of the party P. It will be recognized that a first user may be referred to, for example, as the user U, with friends of the user U being referred to as $U_i$, with i taking on different integer values. A second user may be referred to as user V, with friends of the user V being referred to as $V_i$, with i taking on different integer values. Such designations are used for convenience to refer to parties associated with different users. It will be recognized, however, that a single token will be associated with a single party, and that if two different users have a joint friend, the token received by one user to authenticate his or her association with that friend will be identical to that received by the other user.

In one or more embodiments of the invention, the authentication token generation module 132 includes a timestamp in the authentication token to indicate that the authentication tokens relate to currently identified friends of the requesting user. The status of users with respect to one another can change, and the timestamp suitably indicates a time period within which the status of a user is unlikely to have changed.

For example, a timestamp may indicate that a token was issued in the past day, and each user device may receive an updated set of tokens daily. In that way, users who wish to inquire into the sharing of friends by other users may be assured that matching tokens will represent parties whose identification as friends was current as of the past day. A party will be identified as a joint friend of two users only if those users are able to present identical tokens corresponding to that party. Therefore, a token with an expired timestamp will not correspond to a token with an updated timestamp, and will not result in identification of a friend that is shared by a user having a current token. Periodic updating of timestamps, such as the daily updating discussed here, allows a user to perform identification through direct communication with another user's device, without needing to establish communication with the authentication server 102. It will of course be recognized that any number of mechanisms may be used to insure that tokens are current, and that "currency" may be defined as desired, such as within the past day as presented here, within the past hour, within the past week, or within any other specified time period. It will also be recognized that tokens may simply be provided when needed. For example, if the devices 104A and 104B are to determine the identity or number of their associated joint friends, each of the devices 104A and 104B may request tokens from the authentication server 102 at the time the determination is to be made. The tokens may be designed so as to include indicia identifying them with a particular transaction or inquiry so that they cannot be presented in a subsequent transaction.

Once each of the devices 104A and 104B has been presented with tokens identifying its associated friends, the devices 104A and 104B may perform private set intersection to identify their shared friends, using any of a number of known techniques. It will be recognized that in many applications, what is desired is to provide, for example, users U and V with information indicating whether they can trust one another. Often, what is needed to establish trust between users U and V is not the identities of their shared friends, but the number. In such applications, therefore, only the joint cardinality—that is, the number of shared elements—between the set of user U's friends and the set of user V's friends needs to be computed, and such computation can be accomplished using any number of known techniques.

Once the device 104A has determined that user U can trust user V and the device 104B has determined that user V can trust user U, either or both of them can take actions based on that trust. For example, if both devices have determined that the user of the other device is worthy of trust, the identities of both users, or other private information about the users or devices, the information may be exchanged using techniques for fair exchange of secret information to simultaneously reveal their identities to one another.

It will also be recognized that not all applications will require users to reveal their identities to one another. For example, a user may simply be interested in knowing whether to trust recommendations for goods and services. In that case, all that is needed is to establish with some degree of assurance that a party giving a recommendation is not a shill. This level of trust need not be sufficiently high to justify revealing one's own identity or sharing private information, and also does not require that the party giving such a level of trust receive it from the other party.

In one or more embodiments of the invention, the authentication server 102 provides different tokens based on the closeness of the relationship between a user and a friend of the user. For example, friends of a user U may be classified as close friends, friends, and acquaintances, and tokens may be generated with different keys, such as K_close, K_friend, and K_acquaintance, depending on whether the friends are close friends or immediate family members. If the same party A is a close friend of user U but only an acquaintance of user V, the users U and V will receive different tokens for the user A because the tokens will have been generated with different keys.

The users U and V may, for example, have an interest in knowing the identities or numbers of one another's friends who are at a particular level of intimacy. In such a case, the users U and V may request tokens for each friend of a particular class and perform private set intersection techniques to determine the identities or number of friends falling into the same class for both U and V. Alternatively or in addition, a user may receive multiple tokens for a single friend. For example, a party A who is an intimate friend of the user U will in reality be an intimate friend, a friend, and an acquaintance of the user U. The user U may therefore be given three tokens for the party A, one indicating each level of intimacy. The user V may be merely an acquaintance of the party A, and could be given a token indicating acquaintanceship with the party A. If the device 104A belongs to the user U and the device 104B belongs to the user V, the devices 104A and 104B may perform private set intersection on the tokens relating to the party A for the users U and V. The device 104B would learn that the party A was at least an acquaintance of the user U, but would not learn about any relationship beyond acquaintanceship between the party A and the user U.

It will further be recognized that not all pairings of users will have any joint friends. If this is true in the case of the devices 104A and 104B, a private set intersection on the set of tokens will not reveal any joint friends.

Figure 2:
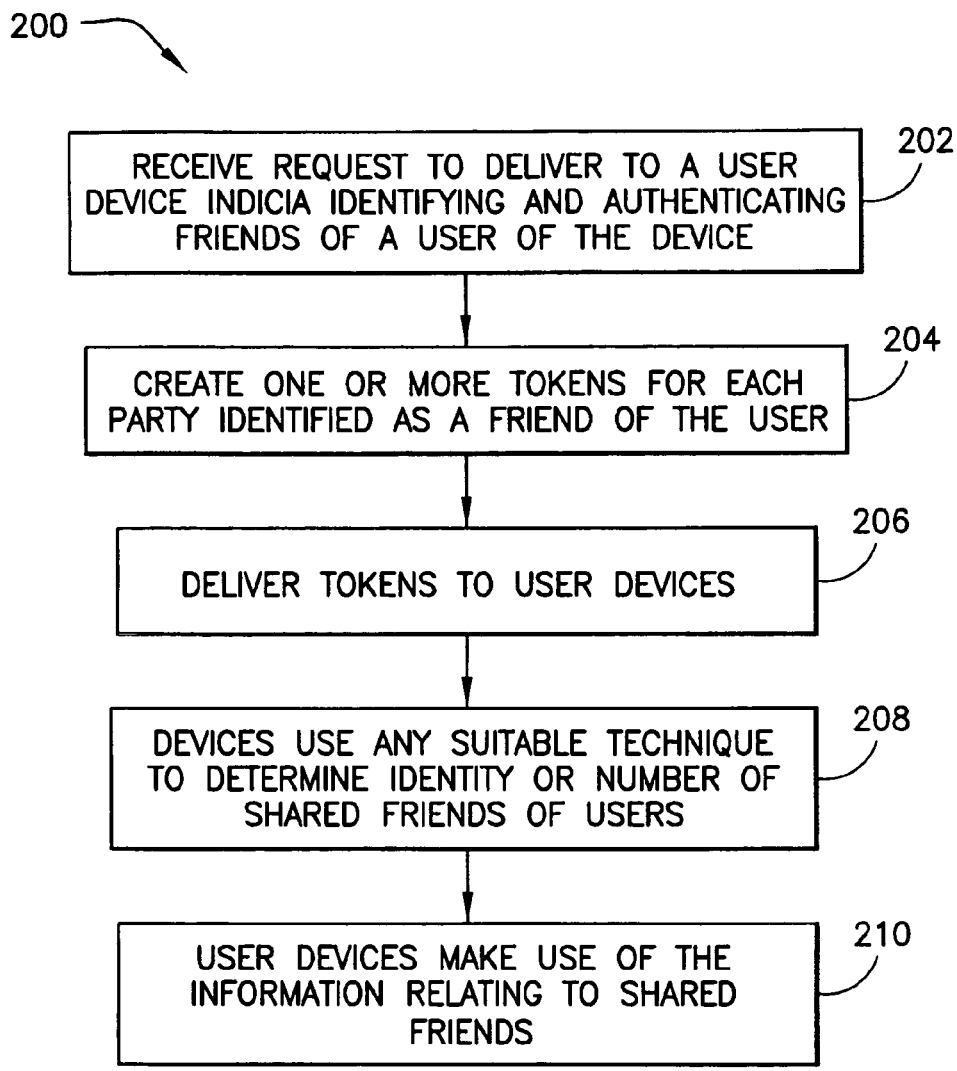
FIG. 2 illustrates a process according to an embodiment of the present invention.

FIG. 2 illustrates a process 200 of friend identification and authentication according to an embodiment of the present invention. At step 202, a request is received to deliver to a user device indicia identifying and authenticating friends of a user of the device, based on association between the friends and the user in a social media network. At step 204, one or more tokens are created for each party identified by the social media network as a friend of the user. Each token is identified with the party and carries authentication indicia identified with the social network identifying the party as a friend of the user. The authentication indicia may be, for example, encryption using a key known only to authorized parties or devices, such as devices belonging to the social media network or authentication devices authorized to perform operations on data associated with the social media network. A token may include indicia to identify the level of intimacy between the user and the friend, such as encryption with a key associated with a particular level of intimacy. A user may receive multiple tokens if his or her relationship with the friend encompasses multiple levels of intimacy. Each token may also include indicia indicating that the relationship is more or less current, such as indicia indicating that it was created within a predetermined time period.

At step 206, tokens are delivered to user devices associated with the users who are identified as friends of the parties identified by the tokens. In one approach, the tokens for each of a pair or other group of users may be delivered to that user in association with a transaction involving the use of the tokens to authenticate the genuineness of the purported friends of each user. At step 208, user devices receiving the tokens use any suitable technique to determine the identities or number of their shared friends. It is possible, of course, that there will be no shared friends. At step 210, the user devices make use of the information relating to the identity or number of the shared friends as desired, such as determining whether to identify themselves to the other devices, or determining whether to trust information received from other devices.

Figure 3A:
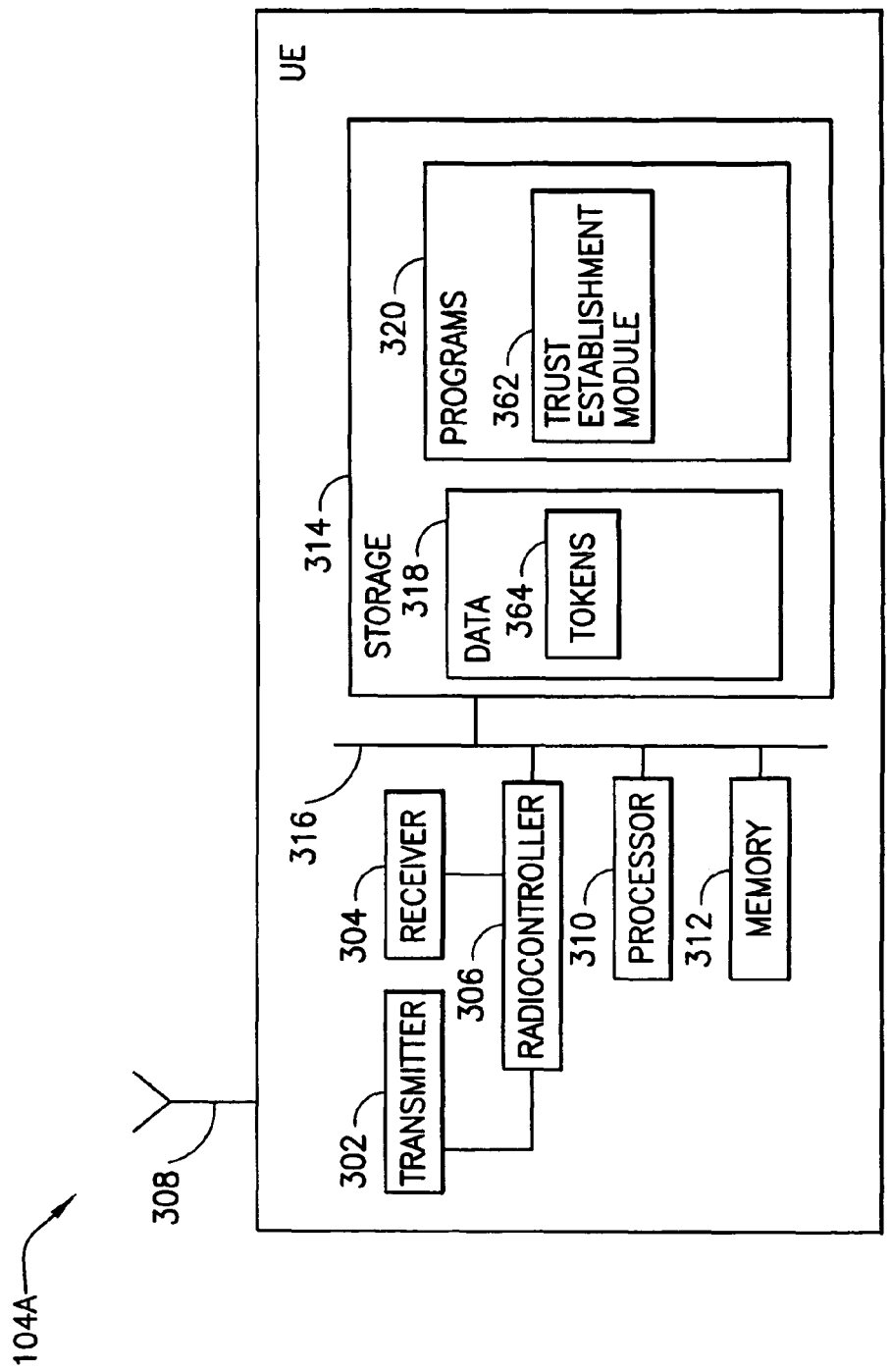
FIG. 3 illustrates details of components according to an embodiment of the present invention.
Figure 3B:
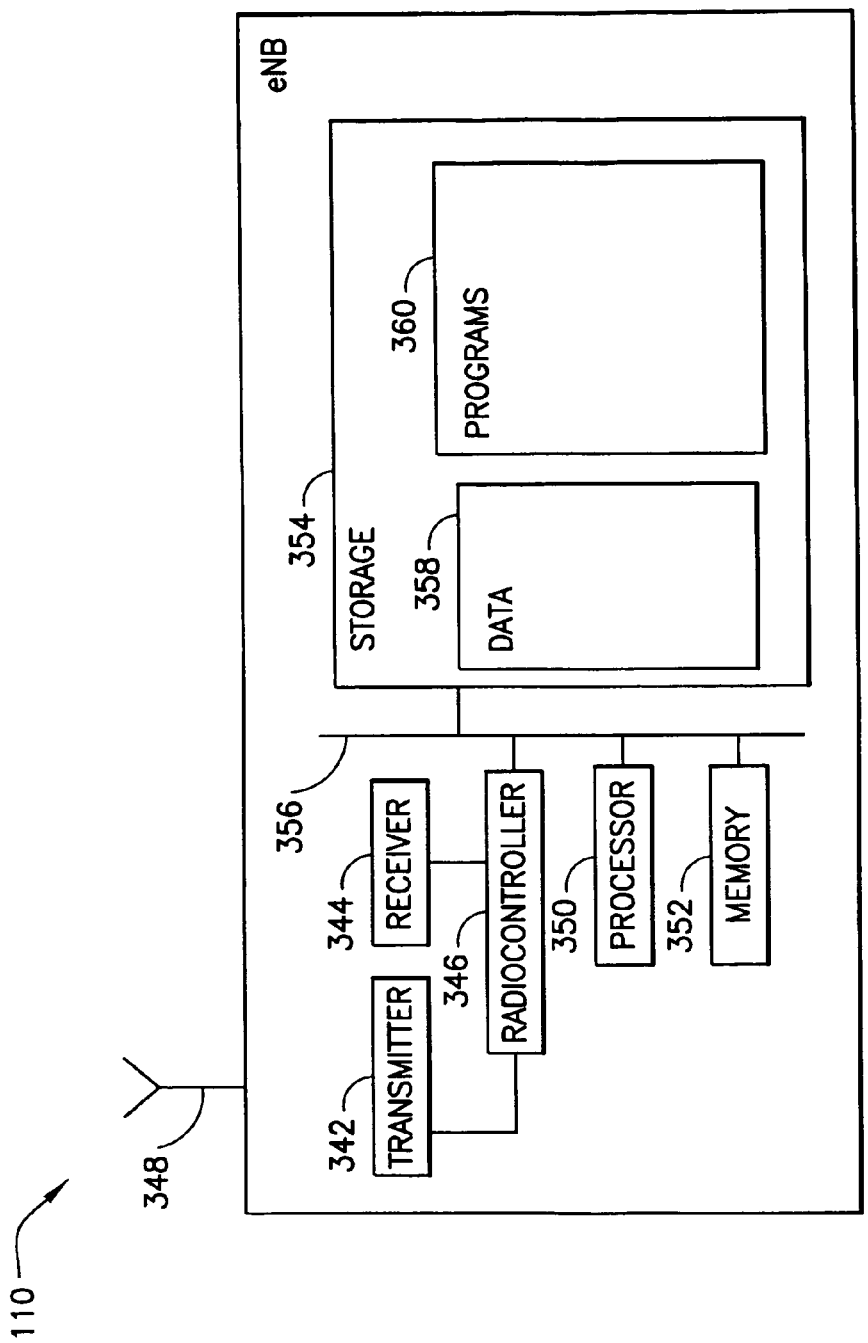

FIG. 3 illustrates additional details of details of the UE 104A and the eNB 110, presented here as representative examples of wireless communication elements used in a system such as the system 100. The UE 104A suitably comprises a transmitter 302, receiver 304, radiocontroller 306, and antenna 308. The UE 104A further suitably comprises a processor 310, memory 312, and storage 314, communicating with one another and with the radiocontroller 306 over a bus 316. The UE 104A suitably further employs data 318 and programs 320, residing in storage 314.

The eNB 110 suitably comprises a transmitter 342, receiver 344, radiocontroller 346, and antenna 348. The eNB 110 further suitably comprises a processor 350, memory 352, and storage 354, communicating with one another and with the radiocontroller over a bus 356. The eNB 110 also suitably employs data 358 and programs 360, residing in storage 354.

The UE 104A may suitably employ as part of the programs 320 a trust establishment module 362. The trust establishment module 362 may suitably use tokens 364, which may be stored as part of data 318 or received as needed through communication with the server 102. The trust establishment module 364 manages the needed communication with a UE such as the UE 104B, with which a trust relationship needs to be established, and performs procedures such as private set intersection or private set intersection cardinality to determine the identity or number of joint friends.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
memory storing a program of instructions;
at least one processor;
wherein the memory storing the program of instructions is configured to, with the at least one processor, cause the apparatus to at least:
receive at least one token from an authenticating authority, wherein the at least one token authenticates a party as a friend of a user of the apparatus, wherein the token is encrypted with a key chosen from among a plurality of keys, and wherein the key used for encryption is selected based on the degree of closeness of a relationship between the user of the apparatus and the party authenticated as a friend of the user of the apparatus;
communicate with a wireless communication device of another user possessing at least one token authenticating at least one party as a friend of the user of the wireless communication device; and
analyze information received in the communication to evaluate the closeness of the relationship between the user of the apparatus and the user of the wireless communication device based on the number of joint friends between the user of the apparatus and the user of the wireless communication device and the closeness of the relationships of the joint friends to the user of the apparatus and to the user of the wireless communication device, wherein analysis of the information received in the communication comprises determining the degree of closeness of the relationship indicated by selection of the key used for encryption.

2. The apparatus of claim 1, wherein at least one of the tokens includes an indicium indicating the degree of closeness of the relationship between the user of the apparatus and the party authenticated as a friend of the user of the apparatus.

3. The apparatus of claim 1, wherein analyzing the information comprises determining the identities of at least one joint friend of the user of the apparatus and the user of the wireless communication device.

4. The apparatus of claim 1, wherein analyzing the information comprises determining the number of joint friends of the user of the apparatus and the user of the wireless communication device.

5. The apparatus of claim 1, wherein at least one of the tokens includes an indicium associating it with the authenticating authority.

6. The apparatus of claim 1, wherein at least one of the tokens includes an indicium associated with a validity period.

7. An apparatus comprising:
memory storing a program of instructions;
at least one processor;
wherein the memory storing the program of instructions is configured to, with the at least one processor, configure the apparatus to at least:
create at least one token authenticating a party as a friend of a user of a wireless communication device, wherein creation of the at least one token comprises encrypting the at least one token using a key selected from a plurality of keys and wherein selection of the key used for encryption is based on the degree of closeness of a relationship between the authenticated party and the user of the wireless communication device, wherein the degree of closeness of the relationship is determined based on the number of joint friends shared between the authenticated party and the user of the wireless communication device and the closeness of the relationships of the joint friends to a user of the apparatus and to the user of the wireless communication device; and
deliver the at least one token to the wireless communication device.

8. The apparatus of claim 7, wherein creating the at least one token comprises encrypting information with a key kept secret from the user of the wireless communication device.

9. The apparatus of claim 7, wherein creating the at least one token comprises creating multiple tokens, wherein each of the multiple tokens comprises an indicium indicating the degree of intimacy of a relationship between the authenticated party and the user of the wireless communication device.

10. The apparatus of claim 7, wherein the at least one token comprises an indicium associated with an interest shared between the authenticated party and the user of the wireless communication device.

11. The apparatus of claim 7, wherein delivering the at least one token to the wireless communication device comprises delivering the at least one token in response to a request by the wireless communication device.

12. A method comprising:
configuring at least one processor to cause an apparatus to perform actions comprising:

creating at least one token authenticating a party as a friend of a user of a wireless communication device, wherein creation of the at least one token comprises encrypting the at least one token using a key selected from a plurality of keys and wherein selection of the key used for encryption is based on the degree of closeness of a relationship between the authenticated party and the user of the wireless communication device, wherein the degree of closeness of the relationship is determined based on the number of joint friends shared between the authenticated party and the user of the wireless communication device and the closeness of the relationships of the joint friends to a user of the apparatus and to the user of the wireless communication device; and delivering the at least one token to the wireless communication device.

13. The method of claim 12, wherein creating the at least one token comprises encrypting the at least one token with a key kept secret from the user of the wireless communication device.

14. The method of claim 12, wherein creating the at least one token comprises creating multiple tokens, wherein each of the multiple tokens comprises an indicium indicating the degree of intimacy of a relationship between the authenticated party and the user of the wireless communication device.

15. A non-transitory computer readable medium storing a program of instructions, execution of which by a processor configures an apparatus to perform actions comprising at least:

creating at least one token authenticating a party as a friend of a user of a wireless communication device, wherein creation of the at least one token comprises encrypting the at least one token using a key selected from a plurality of keys and wherein selection of the key used for encryption is based on the degree of closeness of a relationship between the authenticated party and the user of the wireless communication device, wherein the degree of closeness of the relationship is determined based on the number of joint friends shared between the authenticated party and the user of the wireless communication device and the closeness of the relationships of the joint friends to a user of the apparatus and to the user of the wireless communication device; and delivering the at least one token to the wireless communication device.

16. The computer readable medium of claim 15, wherein creating the at least one token comprises encrypting the at least one token with a key kept secret from the user of the wireless communication device.

17. The computer readable medium of claim 15, wherein creating the at least one token comprises creating multiple tokens, wherein each of the multiple tokens comprises an indicium indicating the degree of intimacy of a relationship between the authenticated party and the user of the wireless communication device.

* * * * *